April 14, 1925.  M. EVANUK  1,533,701

HARROW

Filed July 17, 1924

INVENTOR
Michael Evanuk,
BY
ATTORNEY

Patented Apr. 14, 1925.

1,533,701

UNITED STATES PATENT OFFICE.

MICHAEL EVANUK, OF NEW YORK, N. Y.

HARROW.

Application filed July 17, 1924. Serial No. 726,464.

*To all whom it may concern:*

Be it known that I, MICHAEL EVANUK, citizen of Poland, residing at New York city, in the county of New York and State of New York, have invented certain new and useful Improvements in Harrows, of which the following is a specification.

This invention relates generally to agricultural implements used in preparing ground, the invention having more particular reference to a novel type of harrow. The invention has for an object the provision of an improved harrow which will act more efficiently in breaking up the soil after plowing.

For further comprehension of the invention, and of the objects and advantages thereof, reference will be had to the following description and accompanying drawing, and to the appended claims in which the various novel features of the invention are more particularly set forth.

Fig. 1 of the drawing is a side elevational view of my improved harrow, certain parts being shown in section.

Figure 1:
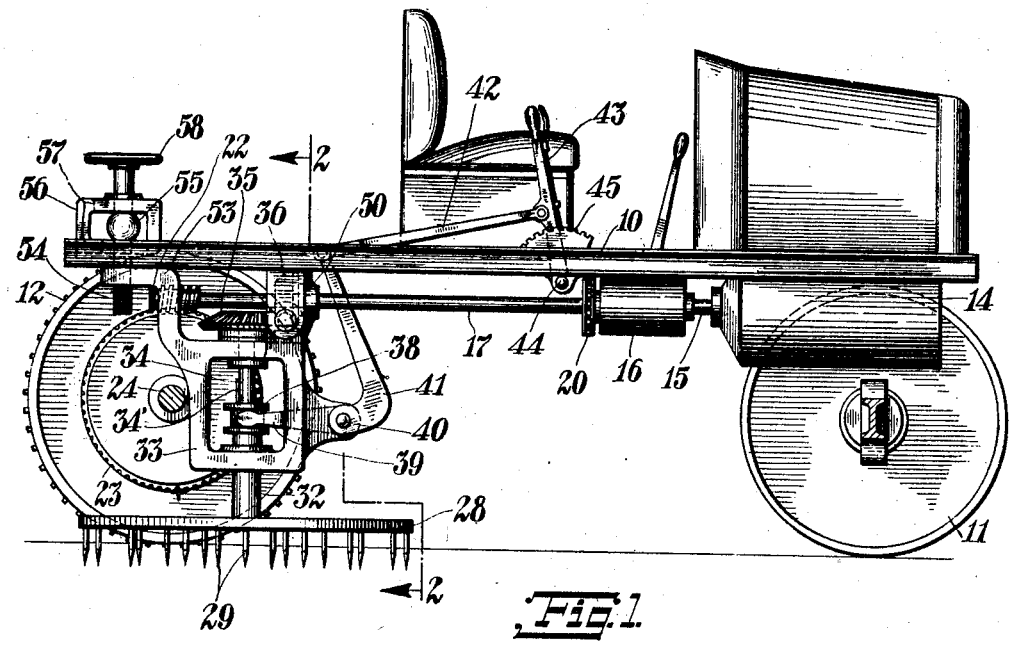
Figures 2, 3:
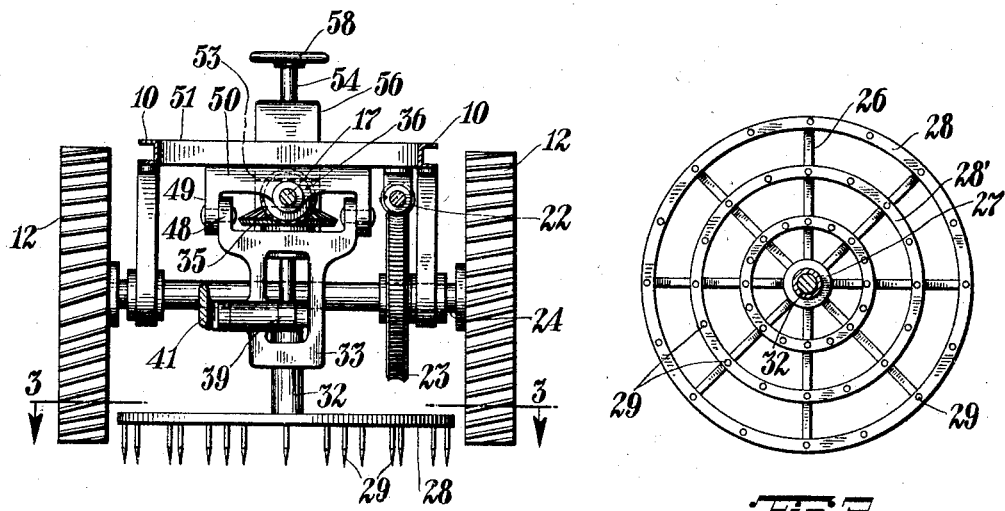
Fig. 2 is a transverse sectional view taken on the line 2—2 of Fig. 1.
Fig. 3 is a detail horizontal sectional view taken on the line 3—3 of Fig. 1 and showing more particularly the rotary harrow.

As here embodied my improved harrow comprises briefly a rotary harrow element which is mounted on a truck to be moved over the ground while being given a rotary movement. The truck may be of ordinary construction, comprising a pair of side frame members 10 supported in the usual fashion on front wheels such as 11 and rear wheels 12. Mounted on the front end of the truck is a gasoline motor 14 from which a shaft 15 extends rearwardly to a change speed transmission device indicated generally at 16. From this transmission unit 16 a shaft 17 extends rearwardly in alinement with the shaft 15 to drive the rotary harrow element. To propel the truck along the ground a sprocket chain 20 is looped over suitable sprocket wheels on the shaft 17 and on a second longitudinally extending shaft 21 at the side of the truck, this shaft 21 having on its rear end a worm pinion 22 which meshes with a worm gear 23 fixed on the rear axle 24.

The harrow element is of circular form as seen in plan view and comprises a number of arms 26 radiating from a hub 27 and braced by a number of concentric rings 28 fixed thereto. These bars 26 may have ordinary harrow teeth 29 fixed therein. The hub 27 is fixed on the lower end of a vertical shaft 32 located just in front of the rear axle 24 and passing upward through a bearing element in the form of a hinged bracket 33 to which further reference will be presently made. This shaft 32 is hollow and engages over the lower end of a second shaft 34 journaled in the bearing bracket 33, these two shafts having a feather connection with one another as indicated at 34'. This shaft 34 has fixed to its upper end a bevel gear 35 that meshes with another bevel gear 36 on the rear end of the main drive shaft 17. Fixed to the upper end of the shaft 32 are two collars 38 between which engages the forked end of an arm 39 to support the shaft 32, and with it the harrow element. This arm 39 is fixed on one end of a stub shaft 40 mounted in the bracket 33 and having a lever arm 41 fixed on its other end and extending upward therefrom. The upper end of this lever arm 41 has connected thereto one end of a link 42 that extends forwardly and is attached at its other end to a lever arm 43 hinged as at 44 to the frame of the truck and provided with an ordinary bolt and segment locking device indicated at 45.

Projecting upward from the bracket 33 at the front side thereof are a pair of ears 48 which are pivotally connected to a pair of ears 49 depending from opposite sides of a block 50 fixed to the underside of a cross brace 51 of the truck frame. The pivotal axis of the bracket 33 is positioned, as shown in alinement with the point of engagement of the gears 35 and 36 with one another, thereby permitting of slight angular adjustment of the bracket without interfering with the operative relation of the said gears to one another. Projecting upward from the rear side of the bracket is an angular member 53 through which is threaded a screw 54 whereby the bracket may be adjusted to vary the angular disposition of the harrow element. This screw 54 has fixed thereto between its ends a spherical element 55 which engages in an open frame 56 fixed on the truck chassis and thereby supports the bracket. This frame member has slots 57 formed in its upper and lower bars to allow of swinging movement of the screw when the bracket is adjusted. The screw 54 may have a handwheel 58 on its upper end for adjustment purposes.

In the operation of my improved harrow, the truck is driven along the ground that is being prepared, the harrow element being given a rotary movement as the truck advances, at a much higher rate of speed than that of the wheels of the truck. It will be apparent that by reason of the combined advancing and rotary movement of the harrow element the teeth of the latter will have a more efficient action in breaking up and preparing the ground.

Having thus described my invention, what I claim as new and desire to protect by Letters Patent of the United States is as follows:—

1. A harrow comprising a truck, a bracket hinged to said truck, a circular harrow, a shaft on which said harrow is mounted, said shaft being supported by said bracket, means for rotating said shaft, and means for angularly adjusting said bracket on said truck.

2. A harrow comprising a truck, a bracket hinged to said truck, a circular harrow, a hollow shaft on the lower end of which said harrow element is fixed, a shaft journaled in said bracket and engaging in said first named shaft at its lower end, a motor, a drive connection from said motor to said second shaft, and means for adjusting said hollow shaft longitudinally upon the second shaft.

3. A harrow comprising a truck, a bracket hinged to said truck, a circular harrow, a hollow shaft on the lower end of which said harrow element is fixed, a shaft journaled in said bracket and engaging in said first named shaft at its lower end, a motor, a drive connection from said motor to said second shaft, and means for adjusting said hollow shaft longitudinally upon the second shaft, and means for angularly adjusting said bracket on said truck.

In testimony whereof I have affixed my signature.

MICHAEL EVANUK.